United States Patent Office 3,322,725
Patented May 30, 1967

3,322,725
PROCESS FOR PREPARING POLYMERS HAVING A HIGH PERCENT OF FREE CARBONYL AND RESULTING PRODUCTS
Leon Hunter, Walnut Creek, and Alan C. Nixon, Berkeley, Calif., assignors to Shell Oil Company, New York, N.Y., a corporation of Delaware
No Drawing. Filed Aug. 7, 1962, Ser. No. 215,296
10 Claims. (Cl. 260—67)

This invention relates to a new process for preparing polymers having a high percent of free carbonyl. More particularly, the invention relates to a new process for converting relatively inactive polymers having little or no free carbonyl into active polymers having a high percent of free carbonyl, to the resulting polymers and derivatives thereof.

Specifically, the invention provides a new and highly efficient process for converting insoluble relatively inactive polymers of unsaturated aldehydes, such as, for example, acrolein polymers, which have little or no free carbonyl into polymers which are highly active and have a high percent of free carbonyl and which are substantially free of cross-links and readily soluble in conventional solvents. This process comprises adjusting the pH of the polymer until it is substantially neutral, and then heating the polymer to a temperature above 80° C. until the weight of the polymer is substantially constant. The invention also provides the new active polymers prepared by this process, and valuable derivatives thereof.

As a special embodiment, the invention provides valuable water-soluble derivatives obtained from the above-described activated aldehyde polymers by treating the said polymers with water-solubilizing agents, such as sodium bisulfite and aqueous sulfur dioxide, and particularly quaternary salts as trialkylhydrazinium salts, and preferably Girard's reagents "T" and "P." As a further embodiment, the invention provides a method for utilizing these special water-soluble derivatives of the activated polymers in the treatment of paper to impart improved dry and wet strength and improved dimensional stability and fold endurance.

As still a further embodiment, the invention provides new and useful solvent soluble derivatives of the above-described activated aldehyde polymers.

It is known that unsaturated aldehydes, such as acrolein, can be polymerized through the ethylenic group to form relatively high molecular weight polymers. These polymers, however, are of little practical utility because of their poor solubility characteristics and poor reactivity in general. This is due chiefly to the fact that while the polymers should possess a high degree of reactive aldehyde groups, the said aldehyde groups react during polymerization to form cross-links between polymer chains or form cyclic acetal linkages along the same polymer chain. Such inter-reaction renders the polymers highly insoluble and relatively inert to reaction with other materials. Only by using difficult procedures can one dissolve the polymers or convert them to useable materials.

It is an object of the invention, therefore, to provide a new process for preparing polymers having a high percent of free carbonyl and resulting products. It is a further object to provide a new process for converting relatively inactive aldehyde polymers which have little or no carbonyl into polymers having a high percent or carbonyl. It is a further object to provide a process for converting insoluble relatively inactive acrolein polymers into readily soluble active polymers having a high percent carbonyl. It is a further object to provide a method for converting polymers having a large number of cross-links into polymers which are substantially free of cross-links. It is a further object to convert aldehyde polymers into polymeric materials which have increased solubility in alkali. It is a further object to provide a process for converting aldehyde polymers into polymeric materials which have increased solubility in water-solubilizing agents, such as alkali metal bisulfites and aqueous sulfur dioxide. It is a further object to provide a process for converting aldehyde polymers into a form which is readily soluble in an aqueous solution of certain quaternary salts or Girard's reagents. It is a further object to provide new highly active readily soluble polymers of unsaturated aldehydes. It is a further object to provide water-soluble derivatives of activated aldehyde polymers. It is a further object to provide solvent-soluble derivatives of activated aldehyde polymers. It is a further object to provide new derivatives which are particularly useful for the treatment of fibrous materials as paper and textile. It is a further object to provide new water-soluble derivatives which are effective wet strength agents for bleached sulfite pulp, especially on the alkaline side. It is a further object to provide new paper treating agents which give both wet and dry strength improvements. These and other objects of the invention will be apparent from the following detailed description thereof.

It has now been discovered that these and other objects may be accomplished by the process of the invention which comprises adjusting the pH of the aldehyde polymers, and preferably the acrolein polymers, until they are substantially neutral, and then heating the polymer to a temperature above 80° C. until the weight of the polymer is substantially constant. It has been unexpectedly found that the polymers obtained by this technique have a surprisingly high percent of free carbonyl. It has been found, for example, that while the conventional polymers, such as the polymers of acrolein known as disacryl, have no free carbonyl or up to not more than 10% free carbonyl, the products treated by the present process have up to as high or higher than 80% free carbonyl. Surprisingly, this improvement in carbonyl is obtained without any detrimental effect on the basic polymer, such as loss in molecular weight, color and the like.

The new activated polymers of the invention are characterized not only by their high carbonyl but also by their freedom from cross-links and greatly improved solubility and reactivity. Thus, while the basic polymers are relatively insoluble in many materials, such as NaOH, and the like, the new activated products have surprisingly good solubility in these materials. In addition, the activated polymers find greater reactivity with materials, such as phenols, amines, alcohols, and the like, and produce therewith a great variety of new and valuable derivatives.

The new water-soluble derivatives obtained by reacting the activated polymers with materials, and preferably those obtained by treatment with aqueous solutions of quaternary salts, such as Girard reagents, "T" and "P," and the like, are particularly outstanding as they have demonstrated unexpected ability as agents for the treatment of fibrous materials, such as textiles, paper, filaments, yarn, and the like. The new water-soluble derivatives have been found to be particularly useful and valuable as wet strength agents for paper. When applied in an aqueous system to paper, either in the heater stage or by dip impregnation, the derivatives combine therewith to form products having surprisingly good wet and dry strength without affecting the feel and hand of the paper product. Furthermore, the improvement in wet strength is permanent and is not lost through hydrolysis as in the case with the wet strength obtained by the use of the conventional nitrogen-containing resins. Further, the improvement is obtained without changing the absorbency, flexibility and other desired properties. In addition, the paper treated with the above-described water-soluble high molecular weight polymers has improved dimensional stability, fold endurance and good tear strength. These polymer derivatives are also characterized in this application by their high efficiency, i.e., high wet strength values are obtained even when small amounts of polymer are employed, and by the fact that the polymer derivatives are effective even without the use of special curing catalysts.

The new water-soluble derivatives, and particularly those prepared from quaternary salt solutions as Girard's reagents are especially outstanding as wet strength agents bleached sulfite paper which has been difficult to effect heretofore. Further advantage is found in the fact that these agents are effective on the desired alkaline side (e.g., pH 8) instead of the acid side.

The solvent-soluble derivatives of the new activated polymers, prepared as hereinafter described, are thermoplastic resinous products useful for a wide variety of applications, such as coatings, films, moldings and the like.

The polymers used in the process of the invention may be any addition-type polymer of unsaturated aldehydes. These polymers may be prepared by a variety of different methods as long as it involves adddition through the ethylenic double bond of the aldehyde as distinguished from polymerization through the aldehyde group. The expression "polymer" as used herein includes the homopolymers of the unsaturated aldehydes as well as copolymers of the aldehydes with other ethlenically unsaturated monomers, and preferably those copolymers containing at least 10% by weight of the unsaturated aldehyde units. The polymers employed may also vary in molecular weight. The preferred polymers are those having an intrinsic viscosity of at least 0.3 dl./g. (deciliter per gram) and preferably between 0.5 dl./g. and 4.0 dl./g. These values are determined by conventional technique of polyelectrolyte (e.g., $Na_2SO_4$) viscosity measurements at 25° C. using the molecular weight, the preferred polymers have molecular weights ranging from about 30,000 to 10,000,000 said weight being determined by the light scattering technique.

The preferred polymers to be employed in the process also have a relatively high theoretical aldehyde function, i.e., when the polymer is subjected to conventional tests for the presence of aldehyde groups (e.g., addition of hydroxylamine hydrochloride and titrated liberated water with Karl Fischer reagent) the results shows a high percent, e.g., above 70%, of the theoretical aldehyde groups. These aldehydes are present chiefly in hydrated form as

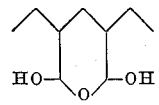

It should be noted that these groups are not free carbonyl. Special techniques must be employed as according to the process of the invention to convert these acetal linkages into the free carbonyl groups which can be detected by infrared analysis. Infrared analysis of the starting polymer as described above shows no free carbonyl or at most only 5–10% free carbonyl.

The starting polymers will also have limited or no solubility in conventional solvents. Thus, the starting polymers will be insoluble in water and insoluble in agents, such as acetone, hydrocarbons, ester, alcohols and the like. They may be made to dissolve, sometimes with difficulty, in agents, such as sodium bisulfite, aqueous sulfur dioxide and the like, as noted hereinafter.

The unsaturated aldehydes used in making the base polymer are preferably the alpha,beta-ethylenically unsaturated aldehydes, i.e., aldehydes having the ethylenic group in an alpha,beta-position relative to the aldehyde groups, such as, for example, acrolein, alpha and beta-substituted acroleins, such as, for example, alpha-ethylacrolein, alpha-isobutylacrolein, alpha-amylacrolein, alpha-chloroacrolein, beta-phenylacrolein, alpha-isohexylacrolein, alpha-decylacrolein, beta-isooctylacrolein, alpha-cyclohexylacrolein, and the like, and mixtures thereof. Preferred aldehydes to be employed in making the polymers include the alpha,beta-monoethyleneically unsaturated monoaldehydes containing from 3 to 12 carbon atoms, and especially acrolein and the alpha and beta-substituted acroleins wherein the substituent on the alpha and/or beta-positions is an alkyl, cycloalkyl, aryl or alkaryl radical containing no more than 8 carbon atoms. 2-alkenals containing up to 8 carbon atoms come under special consideration.

The polymers of the above-described aldehydes also include copolymers of the above-described aldehydes with a dissimilar monomer containing an ethylenic group, such as, for example, acrylonitrile, methacrylonitrile, crotonaldehyde, acrylic acid, methacrylic acid, methyl acrylate, ethyl acrylate, methyl methacrylate, butyl acrylate, vinyl acetate, dibutyl maleate, diallyl phthalate, allyl acetate, allyl benzoate, vinyl chloride, vinylidene chloride, styrene, alphamethyl styrene, butadiene, methylpentadiene, isoprene, vinylpyridine, N-vinylpyrolidone, acrylamide, N-methyl acrylamide, 1,4-octadiene, divinyl adipate, ethylene, propylene, isobutylene, and the like, and mixtures thereof. Particularly preferred monomers to be employed include the alpha,beta-ethylenically unsaturated nitriles, the alkyl esters of the acrylic and alpha-substituted acrylic acids, vinyl esters of monocarboxylic acids, allyl esters of polycarboxylic acids and monocarboxylic acids, monoolefins, polyolefins, nitrogen-containing monomers as the amides of unsaturated carboxylic acids, vinylpyridine and the N-vinylpyrolidones, all members of the foregoing preferably containing no more than 12 carbon atoms each.

The above-described high molecular weight homopolymers and copolymers may be prepared by a variety of different methods. They may be obtained, for example, by polymerizing the monomer or monomers in the presence of free radical yielding catalysts and certain temperature conditions, in the presence of redox polymerization catalysts, or by use of high energy ionizing radiation. Suitable methods for polymerizing the monomers are described and claimed in copending patent application Ser. No. 859,156, filed Dec. 14, 1959, now Patent No. 3,079,357, copending application Ser. No. 859,154, filed Dec. 14, 1959, now Patent No. 3,167,529, copending application Ser. No. 63,987, filed Oct. 21, 1960, now Patent No. 3,105,801, and copending case Ser. No. 95,831, filed Mar. 15, 1961, now Patent No. 3,081,244, and so much of the disclosure of these two applications relative to these polymers and their preparation is incorporated into this application.

The preparation of some of the acrolein polymers by the above-noted methods is illustrated below.

*Polymer A*

100 parts of acrolein was added to 400 parts of water, to this mixture was added .271 part of potassium persulfate, .203 part of ferrous chloride tetrahydrate, 1 part of nonyl-phenol-ethylene oxide adducts as anti-coalescent agent and .4 part of disodium salt of ethylene diamine tetacetic acid. The resulting mixture was stirred for 24 hours at room temperature under atmosphere of nitrogen. During this period a white solid precipitated to the bottom. The mixture was filtered and the solid precipitate was washed with water and dried to yield 47 parts of polymer. The resulting product was a white powder polymer having an intrinsic viscosity (as determined on the sulfur dioxide solubilized form) of 1.8 dl./g.

*Polymer B*

100 parts of acrolein was added to 300 parts of water and to this mixture was added .272 part potassium persulfate, .203 part of ferrous chloride, tetrahydrate and .4 part of disodium salt of ethylene diamine tetacetic acid. The resulting mixture was stirred for 25 hours at 0° C. under an atmosphere of nitrogen. During that period a white solid precipitated to the bottom. The mixture was filtered and the solid precipitate was washed with water and dried to yield 27 parts polymer. The resulting product was a white powder polymer having an intrinsic viscosity (as determined on the sulfur dioxide solubilized form) of 2.3 dl./g.

*Polymer C*

1000 parts of acrolein was added to 2000 parts of water and to this mixture was added 2.73 parts of potassium persulfate, 2.02 parts ferrous chloride tetrahydrate, 10 parts of nonylphenol-ethylene oxide condensate and 4 parts of disodium salt of ethylene diamine tetracetic acid. This mixture was stirred for 42 hours at room temperature (20° C.) under nitrogen. The resulting product was a white powder polymer having an intrinsic viscosity of 1.5.

*Polymer D*

100 parts of acrolein was added to 325 parts of water and to this mixture was added 2.70 parts of potassium persulfate, 2.00 parts of ferrous chloride tetrahydrate and 4 parts of disodium salt of ethylene diamine tetracetic acid. This mixture was kept at room temperature for 6 hours with stirring and under an atmosphere of nitrogen. The resulting 46 parts product was a white powder polymer having an intrinsic viscosity of 1.02 dl./g.

*Polymer E*

Acrolein was added to water to form a 20% solution. A polyacrolein-sulfur dioxide adduct having an intrinsic viscosity of about 2.26 dl./g. was added to form an 0.2% solution. This mixture was placed in a glass reactor and the air swept out with nitrogen. The reactor was sealed and exposed to X-rays at room temperature. The dose rate was $1.8 \times 10^5$ rads per hour. Reaction time was 1½ hours. The reactor was then opened and the solution filtered to remove the solid polymer. The resulting polymer was a white powder having an intrinsic viscosity of 2.23 dl./g.

*Polymer F*

Acrolein was added to water to form a 20% solution. Phosphoric acid was then added to form a 1% solution and .2% nonylphenolethylene oxide adduct was added. This mixture was placed in a glass reactor and air swept out with nitrogen. The reactor was sealed and exposed to an X-ray beam at 25° C. The dose rate was $2.1 \times 10^6$ rads/hour and the total dosage was $1.0 \times 10^6$ rads. The reactor was opened and the solution filtered to remove the solid polymer. The resulting polymer had an intrinsic viscosity of 1.1 dl./g.

The above-described polymers are converted to the new activated polymers by the process of the invention which comprises adjusting the pH of the polymer until it is substantially neutral, and then heating the polymer to a temperature above 80° C. until the weight of the polymer is substantially constant. The pH of the polymer prepared by the above-described methods, and particularly those using an aqueous redox polymerization catalyst system with sulfur dioxide-containing reducing agents, will be on the acid side, and preferably about 2 to 5. The pH can be adjusted to the substantially neutral position by the addition of agents, such as sodium hydroxide, sodium carbonate and the like. By substantially neutral is meant a pH say from about 6.0 to about 8.0.

The polymer is then heated to a temperature above about 80° C. Preferred temperatures range from about 100° C. to about 150° C. Temperatures much above 200° C. should not be employed as they tend to insolubilize the polymer.

The heating is preferably accomplished in vacuum or in the presence of inert material, such as nitrogen, methane and the like.

The time of heating will vary depending upon the temperature employed, and upon the degree of activation desired. If one desires to effect as high an activation as possible, e.g., to obtain a free carbonyl of 80% or higher, one should continue the heating in the higher temperature range until the weight of the polymer is substantially constant. With the lower temperature ranges, this time will generally vary from about 2 to 3 hours. With the higher temperatures, however, the time will be much shorter and of the order of about ½ to 2 hours.

The pressure employed during the process may vary depending on the circumstances. With the use of the inert atmosphere, such as nitrogen, the heating is preferably accomplished at atmospheric pressure. With the use of vacuum, of course, reduce pressures are employed.

As noted, the above-described process will yield a polymer having a high free carbonyl value. The determination of the carbonyl value as reported herein is determined by the use of infrared analysis. The carbonyl is determined by the C=O stretching mode at approximately 5.83 mu. The polymer may have carbonyl values of at least 25% but preferred polymers are those having carbonyl value of 30% to 80%, and still more preferably from 40% to 70%.

The polymers resulting from the above-described process will appear substantially like the original polymers used in the process, i.e., they will be substantially white, solid materials. They will also have substantially the same molecular weight as the original polymer, i.e., they will have molecular weights varying from say 30,000 to 10,000,000 as determined by the light scattering technique. When determined on an intrinsic viscosity basis the polymers will have intrinsic viscosities preferably varying from 0.3 dl./g. to 5.0 dl./g. or greater when stabilized with aqueous $SO_2$. These intrinsic viscosity measurements are determined by the use of a polyelectrolyte (e.g., sodium sulfate or nitrate) at 25° C.

The new polymers are also characterized by being substantially free of cross links.

As noted, the polymers will be characterized by a high free carbonyl. This imparts other improved properties, such as greatly increased solubility and reactivity. As noted above, the new products are far more easy to dissolve in reactants, such as aqueous sulfur dioxide and alkali metal bisulfites, to form valuable water-soluble derivatives. They also dissolve readily in quaternary salts, and preferably the trialkylhydrazinium salts. The anion portion of such salts may be of any type either organic or inorganic or combinations thereof, such as, for example, chloride, bromide, iodide, fluoride, nitrate, p-toluenesulfonate, phosphate, sulfate, methosulfate, chlorate, fluoborate, fluosilicate, sulfite, phosphite, persulfate, arsenate, hypophosphite, borate, selenate, perchlorate, chromate, acetate, benzenesulfonate, thiocyanate, and the like. Examples of the salts include, among others, trimethylhydrazinium chloride,
tributylhydrazinium fluoride,
triphenylhydrazinium sulfate,
benzyldiphenylhydrazinium nitrate,
trioctylhydrazinium methosulfate,
octadecyl dimethylhydrazinium methosulfate,
tributylaminoacetohydrazide chloride,
tricyclohexylaminoacetohydrazide sulfate,
tribenzylaminoacetohydrazide methosulfate,
trioctylaminoacetohydrazide benzene sulfonate,
benzyldioctylaminoacetohydrazide phosphate, and the like.

Preferred salts are those of the formula

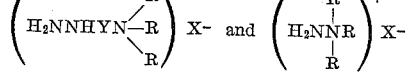

wherein Y is an organic radical and preferably a —$COCH_2$— group, R is a hydrocarbon or substituted hydrocarbon radical with two R's may be joined in a cyclic structure and X is an anion, preferably as noted above.

Coming under special consideration are the trialkyl, triaryl, and tricycloalkylhydrazinium salts and the trialkyl, triaryl and tricycloalkylaminoacetohydrazide salts. The new polymers dissolve readily in Girard's agent "T" (trimethylaminoacetohydrazide hydrochloride) and Girard's reagent "P" (pyridinium acetohydrazide hydrochloride) and give outstanding results as noted above when applied to fibrous material, such as paper. The new polymers also react readily with other reagents, such as amines, alcohols, aminoalcohols, mercaptans and the like, to form new derivatives.

In making the above dissolutions or new derivatives, the new activated polymers are merely stirred into the desired reagent in the appropriate proportions. The amount of the reagent employed will depend on the reactivity desired. In general, it is preferred to employ at least one mole of the reagent for every aldehyde group to be reacted. The reaction is preferably accomplished at room temperature, but increased reaction may be obtained by the use of heat, such as at temperatures of 30 to 100° C. The new derivatives may be used in the solution form or they may be recovered by evaporation or precipitation. In general, they will appear as substantially white solids having substantially the same molecular weight as the starting activated polymer. The chemical nature of the derivative will depend on the reagent employed. Thus, with the use of aqueous sulfur dioxide or bisulfite, the derivative will be the corresponding sulfonic acid or sulfonate salt derivative wherein the aldehyde group has been converted to a sulfonic acid or sulfonate group.

As noted above, the new water-soluble derivatives, such as the products obtained by reaction with aqueous sulfur dioxide or bisulfite, and particularly those obtained by reaction with quaternary salts as Girard's reagent, are outstanding as treating agents for fibrous materials, such as paper.

In the treatment of paper, the polymer derivatives may be applied during the beater stage or as an after-treatment of the paper as by dip impregnation. Preferably the aqueous solution of the polymer derivative is added during the beater stage when the suspension of paper pulp is being agitated. This addition may be at the beginning of the beater operation or at the end of the operation. If the aqueous solution is applied to the finished paper, it may be added by spraying, or by rollers or by dipping or running the paper through the conventional size press.

The concentrations of the aqueous solutions used for treating the paper may vary over a wide range. Preferred concentrations vary from about 0.1% to 5% by weight. Particularly superior results are obtained by the use of concentrations varying from about 0.5% to 2.5% by weight.

The water solutions used in the treatment of the paper may be basic, neutral or acidic. It is generally preferred to employ acidic solutions, e.g., those having a pH between 1.8 and 5, but alkaline solutions, e.g., those having a pH between 7.5 and 9, are also used in many cases. It is sometimes desirable to neutralize and add a polyvalent metal salt, such as, for example, aluminum sulfate, aluminum chloride, ferrous nitrate and the like adjusting the pH to the desired range.

Emulsifying agents, water-dispersible binding colloids, plasticizers, anti-oxidants, dyes, fillers, etc. may also be included in the aqueous system, but are not essential to obtaining the results noted above.

If the aqueous system is to be applied to the finished paper, it may be added by spraying, by rolling, by dipping and the like. Amount of pick-up will vary, but in most cases vary from about 50% to 100% by weight of solution based on the weight of paper.

After the aqueous system has been applied to the paper as indicated above, the treated product is then subsequently dried to effect the cure. The drying may be accomplished by merely rolling or squeezing off the excess solution and then setting out the paper in the air to dry, or by use of forced air. Temperatures used in the drying may vary from about room temperature, e.g., about 20° C., to about 150° C. The period of drying will depend largely on the amount of pick-up and concentration of the polymer solution and the temperature. In most instances, drying periods of from about 1 to 30 minutes should be sufficient.

Any type of paper may be treated according to the process of the invention. Examples of such paper include, for example, those prepared from wood, cotton, linen, hemp, jute, mulberry, straw, bamboo, cane and agone fibers or mixtures thereof, by any of the known processes such as the sulfate process, soda process and sulfite process. The paper may be colored or white and may be further treated for special applications.

The paper treated according to the above process may be used for a variety of applications, such as facial tissue, hand towels, maps, filing cards, construction paper, wrapping paper, containers and the like. Because of its resistance to hydrolysis and relative non-toxic nature, the paper is particularly suited for use in preparing wrapper or containers for food.

The solvent-soluble derivatives of the above-described new high molecular weight polymers may be prepared by a variety of methods. They may be prepared, for example, by adding the solid polymer particles to a liquid medium containing a swelling agent, such as benzene, phenol and the like, an acid catalyst, such as p-toluenesulfonic acid, and a reactive diluent, such as an aliphatic or cycloaliphatic alcohol, such as methanol, ethanol, ethylene glycol, hexyleneglycol, 1,5-pentanediol and the like. The amount of polymer added will generally vary from about 1 to 50 parts of polymer per 100 parts of solvent and swelling agent. The amount of catalyst employed will generally vary from about .1% to 5% by weight of the total solution. The amount of the swelling agent will vary from about 2 to 200 parts per 100 parts of the polymer. The amount of the reactive diluent employed will depend upon the degree of solubility and molecular structural change desired. If, for example, it is desired to convert all of the free carbonyl to the desired groups as acetal groups, an excess of the theoretical amount of diluent needed to effect this change should be employed. In most cases, the amount of diluent employed will vary from about 10 parts to 1000 parts per 100 parts of the polymer.

Stirring and heating may be employed to assist in the formation of the solvent-soluble derivatives. In most cases, the temperatures may vary from about 20° C. up to and including reflux temperatures of the solutions employed.

The solvent-soluble polymer derivatives may be recovered by any suitable means, such as precipitation, extraction, distillation and the like.

The solvent-soluble derivatives when recovered are in most cases substantially white to light colored solids having substantially the same molecular weight as the basic polymer having the free carbonyl. The chemical structure will have changed, however, so as to have a plurality of the free carbonyl groups converted to the desired derivative group, such as acetal groups and the like.

The solvent-soluble products are thermoplastic and can be molded to form plastic articles. They may also be used in the preparation of various coatings and impregnating solutions. They may also find use as viscosity index improvers for various fluids, such as brake fluids, lubricating oils and the like.

To illustrate the manner in which the invention may be carried out, the following examples are given. It is to be understood, however, that the examples are for the purpose of illustration and the invention is not to be regarded as limited to any of the specific materials or conditions recited therein.

*Example I*

This example illustrates the great improvement in carbonyl functionality obtained by the process of the invention.

(a) 100 parts of solid polyacrolein (slurried with water) having an intrinsic viscosity of 1.1 which had been prepared by a peroxide-sulfur dioxide redox polymerization system was treated with sodium bicarbonate solution to adjust the pH from 3 to about 7. The resulting product was then placed in a vacuum oven and heated at 150° C. for 2 hours. At the end of that time, the polymer had reached a constant weight. The product appeared as before and had substantially the same molecular weight. Infrared analysis of the polymer, however, indicated that it now possessed above 50% free carbonyl as compared to 5% for the untreated polymer and was substantially free of crosslinks.

The polymer prepared by the above process demonstrated surprisingly good solubility properties. The polymer was placed in an aqueous solution of 3% sodium bisulfite to give a carbon to sulfur ratio of 6:1 and the mixture stirred at room temperature. In about 16 hours, the polymer had all gone into solution. The untreated polymer treated in the same way had not gone into solution even after 50 days of stirring.

A 3% aqueous dispersion of the polymer prepared above was mixed with Girard Reagent "T" to form a 9% solution as to the Girard reagent. The mixture was stirred at room temperature, and in about 16 hours the polymer had gone into solution. The untreated polymer (3% dispersion), on the other hand, had not dissolved even after 50 hours of stirring.

(b) Another 100 part portion of the solid powered polyacrolein described in (1) above having an intrinsic viscosity of 1.1 as used in (1) above was placed in a vacuum oven and dried at about room temperature for about 24 hours. Analysis of the resulting polymer indicated that there had been no increase in carbonyl and the polymer displayed no change in solubility over the untreated polymer.

(c) Another 100 part portion of the same solid polyacrolein polymer having an intrinsic viscosity of 1.1 was heated to 200° C. for several hours. At the end of this period, the polymer had been converted into an insoluble cross-linked material that could not be dissolved.

(d) Another 100 part portion of the same solid polyacrolein polymer having an intrinsic viscosity of 1.1 was heated to 80° C. without prior adjustment of the pH. In this case the product had reduced solubility probably due to increased cross-linking.

Example II

Example Ia was repeated with the exception that the temperature employed during the heating step was 120° C. The resulting product had a carbonyl content of 60% and was easily dissolved in aqueous sodium bisulfite and Girard reagent.

Example III

Example Ia was repeated with the exception that the polyacrolein employed was one having an intrinsic viscosity of about 0.9 dl./g. and a theoretical aldehyde content of 95% but a free carbonyl of only 5%. The resulting polymer had a high free carbonyl and could be easily dissolved in aqueous sodium bisulfite, Girard reagents and 10% aqueous sodium hydroxide.

Example IV

Example Ia was repeated with the exception that the polyacrolein was adjusted to a pH of 6.5. Related results are obtained.

Example V

This example illustrates the use of the process of the invention in preparing an activated copolymer of acrolein and acrylonitrile.

100 parts of a solid copolymer of acrylonitrile and acrolein (50/50) (slurried with water) and having an I.V. of about 1.0 dl./g. was treated with sodium bicarbonate solution to adjust the pH to about 7. The resulting product was placed in a vacuum oven and heated at 115° C. for 2 hours. At the end of that time, the polymer had reached a substantially constant weight. The product appeared as before and had substantially the same intrinsic viscosity. Infrared analysis of the copolymer, however, indicated that it possessed high free carbonyl and was substantially free of cross-links. The copolymer had increased solubility in aqueous sulfur dioxide as compared to the untreated copolymer.

Example VI

A 3% aqueous dispersion of the activated polymer prepared in Example Ia was mixed with Girard reagent "P" to form a 9% solution as to the Girard reagent. The mixture was stirred at room temperature and in a few hours the polymer had gone into solution. This solution was used to treat paper as shown in Example VII below. Related results are obtained.

Example VII

The Girard derivative of the polymer prepared as in Example Ia was used as a wet strength agent for bleached sulfite paper by addition at the beater stage. 0.5% and 1.0% aqueous solutions of the Girard derivative were prepared by adding additional water. A bleached sulfite pulp was beaten to 650 S-R freeness and diluted to 0.5% consistency. Aliquots of the above-noted polymer derivative solutions were added to portions of the pulp slurry, which were adjusted to pH 8.0 with dilute sodium hydroxide. After a contact time of 10 minutes, handsheets were cast from the pulp slurries in the usual manner using dilution water previously adjusted to pH 8.0. The handsheets were dried on a drum dryer in conventional manner (dryer temp. 225° F. for 6 minutes). The resulting sheets had the appearance, feel and flexibility of the untreated paper, but demonstrated improvement in fold endurance, dimensional stability, resistance to hydrolysis and improvement in wet and dry strength. The improvement in both wet and dry strength is shown in the following table:

| Polymer Concentration, Percent of Dry Pulp | Burst Test, p.s.i. | | Percent Retention of Dry Control |
|---|---|---|---|
| | Dry Strength | Wet Strength | |
| Control | 36 | 1.2 | 3 |
| 0.5% | 44 | 8.0 | 22 |
| 1.0% | 47 | 8.5 | 24 |

Example VIII

Example VII was repeated with the exception that the solutions were added to the beater stage during the preparation of kraft pulp paper. The resulting dried paper sheets demonstrated improvement in fold endurance, dimensional stability, good wet strength and improved dry strength.

Example IX 10 parts of the polymer prepared in Example Ia was placed in a three neck flask and covered with 100 parts of ethanol and 100 parts of acetone as a swelling agent. The mixture was stirred and 1 part of p-toluene sulfonic acid and 50 parts of ethanol added. The mixture was then refluxed for a short period. The polymer readily went into solution from an acetal derivative. The resulting polymer when recovered could be molded at 110° C. to give an attractive plastic article.

Example X

Example VII is repeated with the exception that the ethanol is replaced with each of the following: cyclohexanol, butanol, 2-ethylhexanol. Related results are obtained.

Example XI

Example Ia was repeated at 90° C. Related results are obtained.

Example XII

Example Ia was repeated with the exception that the activated polymer was dissolved in aqueous sulfur dioxide. The polymer readily dissolved in this reagent.

Example XIII

A polymer of acrolein prepared in an aqueous redox system and having an intrinsic viscosity of 1.7 dl./g. was neutralized to pH 7 and activated by heating at 115° C. for two hours. The resulting product was then dissolved in aqueous caustic. The results are shown in the following table as compared to the unactivated polymer.

| Polymer | Polymer, moles | NaOH, moles | Water, mls. | Soluble Product, Percent of Theory |
|---|---|---|---|---|
| Unactivated | 0.25 | 0.38 | 630 | <18 |
| Activated | 0.25 | 0.38 | 630 | 60 |

In a related experiment, a polymer of acrolein having an intrinsic viscosity of .9 dl./g. was neutralized and activated at 120° C. for two hours. The resulting product dissolved in aqueous caustic to give 80% of theoretical product.

The polymers of the present invention, as exemplified by those shown in the preceding examples, react with materials, such as alcohols, thioalcohols, thiophenol, hydroxyamine, semicarbazides, and the like, to form valuable soluble derivatives thereof.

We claim as our invention:

1. A solid water-insoluble high molecular weight polymer of acrolein having good solubility in caustic, an intrinsic viscosity between 0.9 dl./g. and 3.0 dl./g. and having a free aldehyde carbonyl value of at least 25% as determined by infrared analysis.

2. A solid water-insoluble high molecular weight polymer of acrolein having good solubility in caustic, an intrinsic viscosity between 0.9 dl./g. and 3.0 dl./g. and possessing from 25% to 90% of the acrolein units as

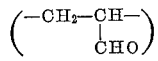

units as determined by infrared analysis.

3. A solid polymer of acrolein having good solubility in caustic an intrinsic viscosity between 0.9 dl./g. and 3.0 dl./g. and from 40% to 90% free aldehyde carbonyl as determined by infrared analysis.

4. A water-insoluble acetone-insoluble polyacrolein having good solubility in caustic, an intrinsic viscosity between 0.9 dl./g. and 3.0 dl./g. and a free aldehyde carbonyl value of 40–80% as determined by infrared analysis.

5. A water-soluble reaction product of the polymer defined in claim 1 and a trialkylamino acetohydrazide salt wherein each alkyl group contains no more than 8 carbon atoms.

6. A process for preparing addition polymers of acrolein having a free aldehyde carbonyl value of at least 25% as determined by infrared analysis which comprises adjusting the pH of an addition polymer of acrolein having a free aldehyde carbonyl value of not greater than about 10% as determined by infrared analysis and an intrinsic viscosity of between 0.9 dl./g. and 3.0 dl./g., to make the pH of the polymer substantially neutral and then heating the polymer to a temperature above 80° C. but below about 200° C. until the polymer reaches substantially constant weight.

7. A process for preparing polymers having a free aldehyde carbonyl value of 40% to 90% which comprises adjusting the pH of an acrolein polymer having an intrinsic viscosity between 0.3 dl./g. and 3.0 dl./g. and a free aldehyde carbonyl value of not more than about 10% to about 6–7, and then heating the said polymer to a temperature between 80° C. and 150° C. until the polymer reaches substantially constant weight.

8. A process as in claim 7 wherein the polymer is polyacrolein.

9. A water soluble reaction product of a polymer defined in claim 1 and a salt of the group consisting of (1) salts of the formula

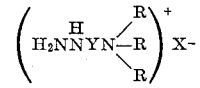

wherein Y is a —COCH$_2$— group, R is a hydrocarbon radical containing up to 8 carbon atoms wherein at least 2 of the R's may be joined in a cyclic structure, and X is an anion of the group consisting of chlorine, bromine, iodine, fluorine, and nitrate, p-toluenesulfonate, phosphate, sulfate, methosulfate, chlorate, fluoborate, fluosilicate, sulfite, phosphite, persulfate, arsenate, hypophosphite, borate, selenate, perchlorate, chromate, acetate, benzensulfonate, and thiocyanate radicals, and (2) salts of the formula

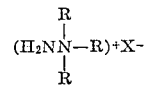

wherein R and X are as described above.

10. A process for treating paper to improve its wet strength properties which comprises adding to the paper sometimes during the wet end of fabrication an aqueous solution of the reaction product of (1) a solid polymer of acrolein having an intrinsic viscosity of at least 0.1 dl./g. and by infrared analysis a free carbonyl value of 30–80%, and (2) trimethylaminoacetohydrazide hydrochloride.

References Cited

UNITED STATES PATENTS

| | | | |
|---|---|---|---|
| 2,657,192 | 10/1953 | Miller et al. | 260—67 |
| 2,940,955 | 6/1960 | Shokal et al. | 260—67 |
| 2,985,610 | 5/1961 | Blanchette et al. | 260—67 |
| 2,993,878 | 7/1961 | Marks | 260—67 |
| 3,069,389 | 12/1962 | Welch | 260—67 |
| 3,079,280 | 2/1963 | Houff et al. | 260—67 |
| 3,079,296 | 2/1963 | Houff et al. | 260—67 |
| 3,079,357 | 2/1963 | Fischer | 260—67 |
| 3,093,506 | 6/1963 | Tsatsos | 117—155 |
| 3,105,801 | 10/1963 | Bell et al. | 260—67 |
| 3,121,700 | 2/1964 | Bergman et al. | 260—67 |
| 3,141,864 | 7/1964 | Rink | 260—67 |

FOREIGN PATENTS

| | | |
|---|---|---|
| 797,459 | 7/1958 | Great Britain. |
| 803,053 | 10/1958 | Great Britain. |

WILLIAM H. SHORT, *Primary Examiner.*

L. MILLER, J. C. MARTIN, *Assistant Examiners.*